(12) United States Patent
Raymond

(10) Patent No.: US 11,381,461 B1
(45) Date of Patent: Jul. 5, 2022

(54) SYSTEMS AND METHODS FOR AUTOMATED NETWORK STATE AND NETWORK INVENTORY TRACKING

(71) Applicant: DISH Wireless L.L.C., Englewood, CO (US)

(72) Inventor: Paul-André Raymond, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/158,988

(22) Filed: Jan. 26, 2021

(51) Int. Cl.
*H04L 29/02* (2006.01)
*H04L 41/12* (2022.01)
*H04L 41/16* (2022.01)

(52) U.S. Cl.
CPC .............. *H04L 41/12* (2013.01); *H04L 41/16* (2013.01)

(58) Field of Classification Search
CPC ............................... H04L 41/12; H04L 41/16
See application file for complete search history.

(56) References Cited

U.S. PATENT DOCUMENTS

| 10,735,270 | B1 | 8/2020 | Whipple et al. |
| 2019/0230112 | A1 | 7/2019 | Gandham et al. |
| 2019/0377654 | A1* | 12/2019 | Rakhimov ............ H04L 63/083 |
| 2020/0220782 | A1* | 7/2020 | Parangattil .............. H04L 41/12 |
| 2020/0409826 | A1 | 12/2020 | Balasubramanian et al. |

OTHER PUBLICATIONS

International Search Report and Written Opinion, dated Apr. 14, 2022, for International Application No. PCT/US2022/013734, 23 pages.

* cited by examiner

*Primary Examiner* — Adnan M Mirza
(74) *Attorney, Agent, or Firm* — Seed IP Law Group LLP (57) ABSTRACT

A network state tracking system tracks the state of a network and recommends an action when the state of the network changes. The network state tracking system detects one or more nodes on the network and generates one or more snapshots of the network. The snapshots are generated by obtaining first and second status data from the nodes and detecting whether a change in the network has occurred based on the status data. The snapshots are generated based on the first and second status data when a change in the network is detected. The snapshots are then used to train a machine learning model to recommend an action to take when a change in the network occurs.

20 Claims, 9 Drawing Sheets

SYSTEMS AND METHODS FOR AUTOMATED NETWORK STATE AND NETWORK INVENTORY TRACKING

BRIEF SUMMARY

A network inventory refers to a repository storing data regarding all user devices, virtual machines, network infrastructure devices, software programs, resource pools, clusters, etc., (collectively referred as "nodes") which are connected to a computer network. Information technology (IT) specialists and network engineers routinely use data stored in a network inventory. However, because of the dynamic nature of network inventories, IT specialists and network engineers are unable to analyze the data stored in a network inventory to inform their decisions regarding the network. Additionally, while logs from nodes can be analyzed, the significance of such events can only be understood in the context of the entire network state at the time the log was generated, and traditional methods are unable to provide such a context. Furthermore, they do not have adequate tools to recommend actions to take when a change in the network inventory occurs.

The embodiments disclosed herein address the issues above and thus help solve the above technical problems and improve the technology of network state and network inventory tracking by providing a technical solution that collects data from a multitude of nodes connected to a network and using that data to train a machine learning model which recommends and action to take when the state of the network changes. Additionally, the embodiments disclosed herein are further able to be integrated in place of, or in conjunction with, network infrastructure devices and software, such as devices, software, and container-orchestration systems for computer application scaling, deployment, and management. Furthermore, the embodiments disclosed herein are further able to be scaled up or down to accommodate large network infrastructures, such as a nationwide network, to small network infrastructures, such as a home network.

In some embodiments a network state tracking system detects one or more nodes on a computer network, generates snapshots of the network including status data related to the nodes, and trains a machine learning model to suggest an action to take based on a determination that the network state has changed. In some embodiments, the network state tracking system receives status data from a node, determines whether the network state has changed based on the status data, and transmits an action to take to the node based on a determination that the network state has changed. In some embodiments, the network state tracking system includes a network state tracking data structure which can be used to train a machine learning model to predict an action to take when a change in the network state occurs.

DETAILED DESCRIPTION

Network engineers and IT specialists (collectively "users") generally work with network inventories and use these inventories to assist in solving problems with the network, such as connection issues, bandwidth issues, etc., in the development of software or hardware which accesses the network, or in diagnosing or fixing issues with nodes. It is currently difficult for users to diagnose network issues and to keep track of changes in the network state. Furthermore, it is difficult for users to determine an action to take when a change in the network state occurs. It is also difficult to understand why an action had been taken in the past given that the network state has changed since.

The embodiments disclosed herein address the issues above and help solve the above technical problems and improve the technology of network state, network configuration, and network inventory tracking by providing a technical solution that collects data from a multitude of nodes connected to a network and using that data to train a machine learning model which recommends and action to take when the state of the network changes. A network state tracking system additionally uses a network inventory to store data and track the network state. The network state tracking system uses the stored data to train a machine learning model to suggest an action to take when the network state tracking system detects a change in the network state. The machine learning model is thereby trained to interpret the changes to individual nodes in the context of the overall network state, and make a more informed suggestion of an action to take. In some embodiments, the machine learning model is trained to suggest actions for other scenarios, such as: the demand on the network; preventing failures in the network; proposing configuration changes to the network, such as for enhancing performance, optimizing utilization, etc.; scheduling operations on the network; etc.

In some embodiments, the network state tracking system provides the training data to an external training system. The network state tracking system may use the data to train an artificial intelligence or machine learning model (an ""AI/ML model") that will be deployed to an external artificial intelligence engine. The AI/ML model may by operated on a device or system external to the network state tracking system. The network state tracking system may use the data, perform the training, and obtain an inference of an action to take. In embodiments where the network state tracking system utilizes or interfaces with an external model, the network state tracking system may provide data related to the current or historical status of the network to the external model. The network state tracking system may perform different combinations of those embodiments (e.g. train some models and provide data to external systems which will train other models, which may include external models)).

In some embodiments the network state tracking system detects one or more nodes in a network, generates one or more snapshots of the network, then trains a machine learning model to recommend an action to take based on the snapshots of the network. The network state tracking system may obtain status data from the nodes of the network. The network state tracking system may utilize the status data to create snapshots of the network. The network state tracking system may utilize the snapshots to determine whether there was a change in the network state. The network state tracking system may detect whether there was a change in the network state based on the status data. The network state tracking system may generate a snapshot when a change in the network state is detected.

In some embodiments, status data is obtained from a node when the node connects to the network. The status data may be obtained from logs generated by the node. The status data may include configuration data of the node. The status data may include information about how a collection of nodes is structured and organized.

In some embodiments, the network state tracking system periodically receives additional status data from one or more nodes. The additional status data may be used to generate an additional snapshot of the network. The network state tracking system may use the additional snapshot as input for the machine learning model to obtain an action to take.

In some embodiments, the network state tracking system obtains status data from nodes and generates snapshots periodically. The network state tracking system may receive a request to generate snapshots from an external system. The network state tracking system may determine whether there are any differences between a generated snapshot and a previous snapshot. The network state tracking system may store the differences between the generated snapshot and the previous snapshot. The network state tracking system may store the differences between the generated snapshot and previous snapshot, without storing the generated snapshot. When the network state tracking system stores the differences between the generated snapshot and the previous snapshot instead of the entire snapshot, the network state tracking system is able to reduce the amount of memory used to store snapshots by storing only the differences between snapshots rather than complete snapshots. The network state tracking system may use the differences between snapshots and a first snapshot to create a log of the history of changes in the network state.

In some embodiments, the network state tracking system stores the snapshots in a data lake. The network state tracking system may store differences between snapshots within a data lake. The network state tracking system may include inventory storage devices. The inventory storage devices may be used to store data obtained from or related to nodes.

In some embodiments, a node transmits status data representing its status to the network tracking system. The node may transmit the status data to the network tracking system multiple times over a period of time. The node may transmit the status data periodically. The node may obtain in indication of an action to take from the network tracking system.

In some embodiments, a node transmits status data based on a determination that it has connected to a network which is being tracked by the network state tracking system. The node may generate a log including status data, such as configuration information and state information, for the node. The node may transmit the log to the network state tracking system. The node may transmit status data to an inventory storage device. The node may obtain configuration data, and apply the configuration data to the node. A node may transmit status or configuration data on behalf of or about another node (e.g. an Element Management System may transmit information about the element it manages, an orchestration system may transmit information about how it structures the nodes it orchestrates or about a new virtual machine it just created). The configuration data may be obtained from the network state tracking system.

In some embodiments, the network state tracking system utilizes a network state tracking data structure. The network state tracking data structure may be used to store information regarding nodes, including information related to the status of a node. The network state tracking data structure may also include information related to network snapshots. The network state tracking system may use the network state tracking data structure to determine whether the state of the network has changed. The network state tracking system may utilize the network state tracking data structure to train a machine learning model to determine an action to take when a change in the state of the network is detected. At least a portion of the network state tracking data structure may be stored within an inventory storage device. The network state tracking data structure may include configuration data for one or more of the nodes.

In some embodiments, the network state tracking data structure stores differences between network snapshots. The differences between network snapshots may be used in conjunction with a network snapshot to reconstruct the state of the network at any time after, or before, the network snapshot was taken. The network snapshots may include configurations for each node, or for the network as a whole, and may be used to track changes in the configurations over time.

In some embodiments, the network state tracking data structure includes information specifying one or more sub-networks included within a network. The network state tracking system may associate each sub-network with its own network state tracking data structure. The network state tracking system may use data from each sub-network to train a machine learning model to suggest an action to take for the network. The network state tracking system may use data from each sub-network to train a machine learning model to suggest an action to take for a sub-network when a change in the state of the sub-network is detected.

In some embodiments, the network state tracking system detects whether a change in the network state was a positive change or a negative change. A positive change may include, but is not limited to raising, enhancing, or otherwise improving network resources. A negative change may include, but is not limited to, lowering, degrading, or otherwise reducing network resources. Positive or negative changes in a network may include more than the improvement or reduction of network resources. The network state tracking system may obtain user input indicating whether a change was positive or negative. The network state tracking system may infer whether an action was taken based, at least in part, on one or more of: what device caused the change in the network state, whether the change was positive or negative, and the status data before and after the change occurred.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
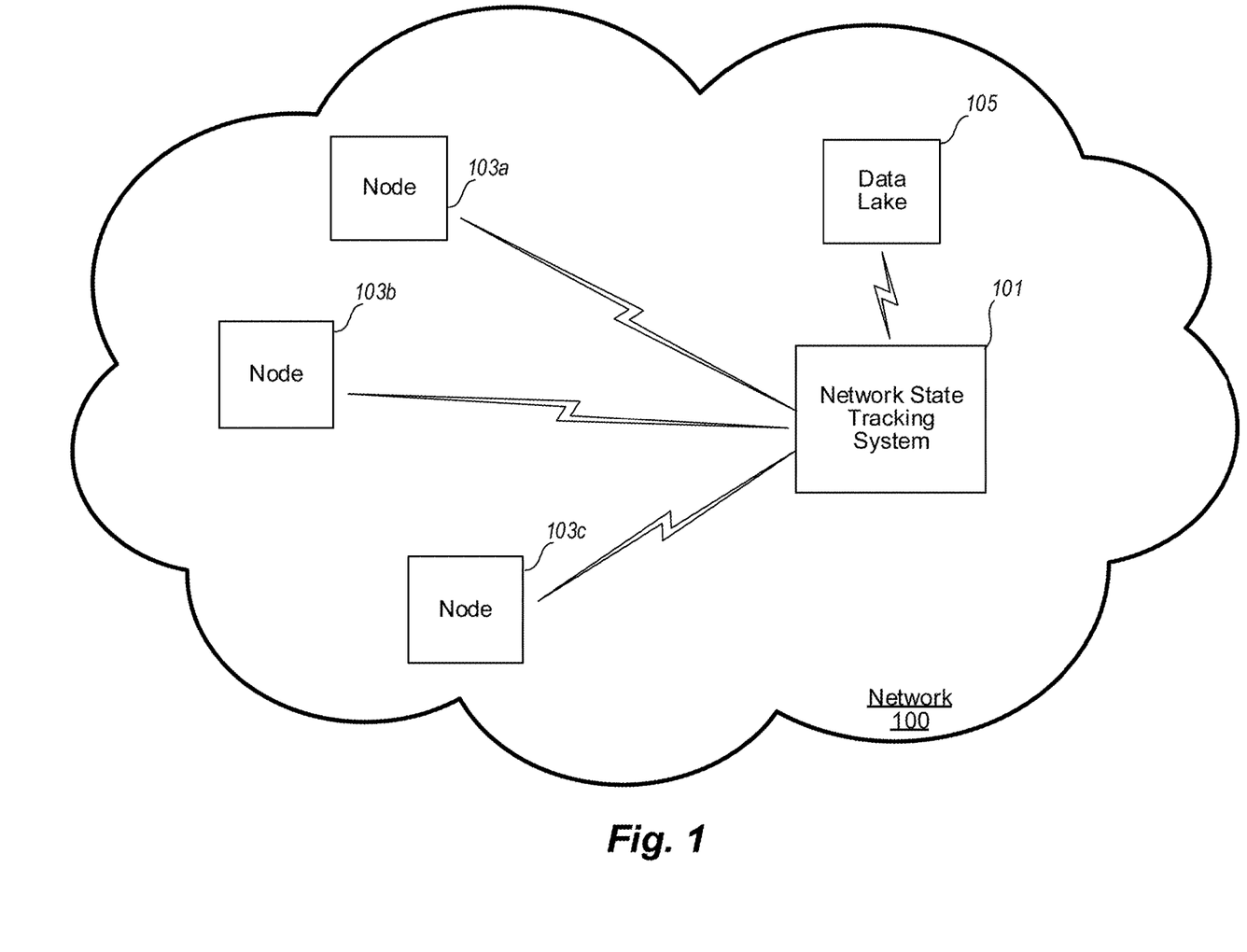
FIG. 1 is a display diagram showing an example network in which the network state tracking system operates, according to various embodiments described herein.

FIG. 1 is a display diagram showing an example network 100 in which the network state tracking system operates, according to various embodiments described herein. It is to be appreciated that FIG. 1 illustrates just one example of a network in which a network state tracking system operates, and that various embodiments discussed herein are not limited to the use of such an environment. The network 100 includes a network state tracking system 101, one or more nodes 103a-103c, and an inventory storage device 105. The inventory storage device 105 further includes a data lake 300 which is further described in relation to FIG. 3 below.

The network 100 is a network, communication system, or networked system (not shown), to which the network state tracking system 101, as well as nodes 103a-103c and other endpoint devices (not shown), and the inventory storage device 105 may be coupled. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access ("WiMax") devices, or the like, may be communicatively coupled to the network and/or to each other so that the plurality of endpoint devices are communicatively coupled together. Thus, such a network enables the network state tracking system 101, nodes 103a-103c, the inventory storage device 105 and any other interconnected endpoint devices, to communicate with each other.

The nodes 103a-103c may include devices such as routers, switches, route reflectors, firewalls, proxies, load balancers, Cell towers, antennas, Radio Access equipment, Core network equipment, content distribution equipment, orchestration systems, network management systems, network assurance systems, servers, storage equipment, transmission equipment, data center equipment, road side units, cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices, routers, digital assistants, personal assistant devices, virtual machines, network infrastructure devices, etc. The nodes 103a-103c may interconnect to one or more communications media or sources, such as routers, network switches, modems, etc., to transmit communications to other devices. The nodes 103a-103c may transmit data representing their status, configuration, and network statistics, such as time connected, bandwidth, upload and/or download speed, etc., to the network state tracking system 101.

The above description of the network 100, and the various devices therein, is intended as a broad, non-limiting overview of an example environment in which various embodiments of a network state tracking system 101 can operate. The network 100, and the various devices therein, may contain other devices, systems and/or media not specifically described herein.

Example embodiments described herein provide applications, tools, data structures and other support to implement systems and methods for managing the state of a network. The example embodiments described herein additionally provide applications, tools, data structures and other support to implement systems and methods for providing determining whether a change has occurred on a computer network, as well as what caused the change to occur. Other embodiments of the described techniques may be used for other purposes, including for training a machine learning model to generate an action to take when a change in the network state is detected. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
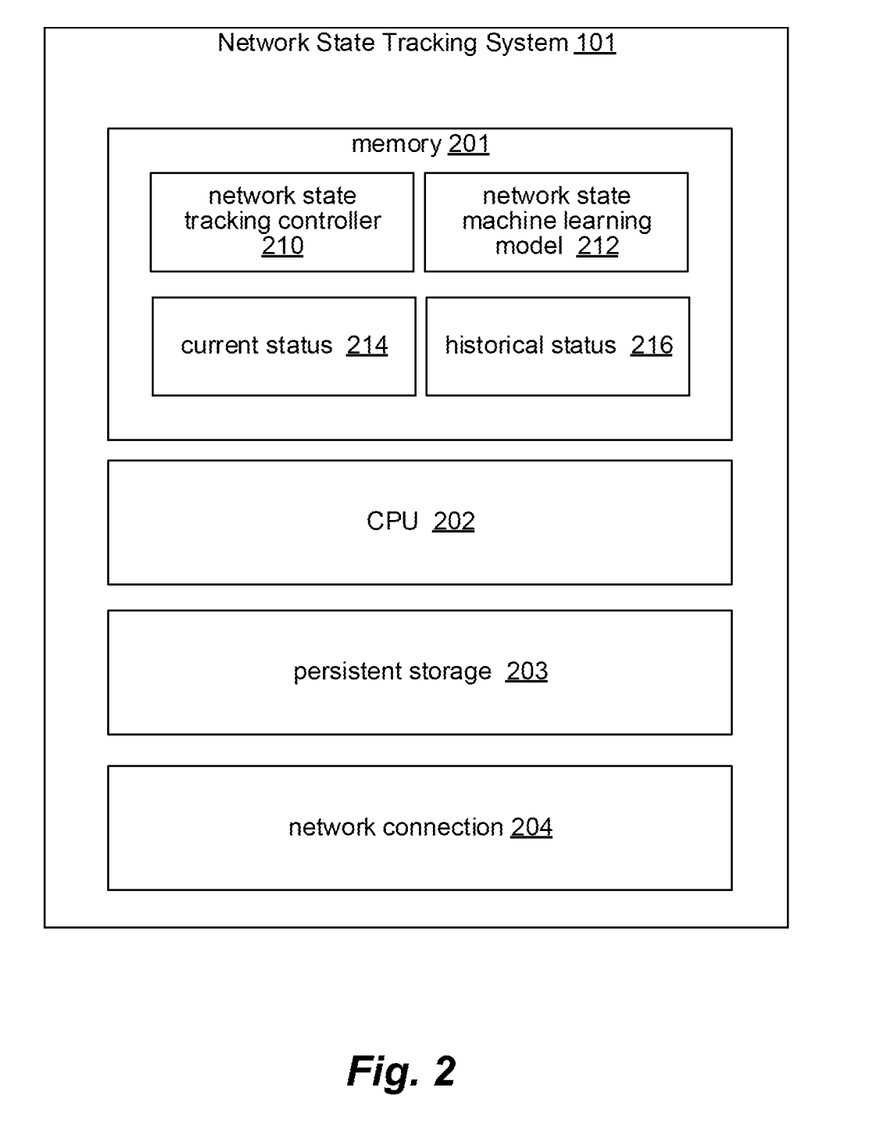
FIG. 2 is a block diagram depicting example components incorporated in a network state tracking system, according to various embodiments described herein.

FIG. 2 is a block diagram depicting example components incorporated in a network state tracking system 101, according to various embodiments described herein. In various embodiments, the network state tracking system 101 includes one or more of the following: a computer memory 201 for storing programs and data while they are being used, including data associated with the nodes 103a-103c, inventory storage device 105, and the network state tracking system 101, an operating system including a kernel, and device drivers; a central processing unit ("CPU") 202 for executing computer programs; a persistent storage device 203, such as a hard drive or flash drive for persistently storing programs and data; and a network connection 204 for connecting to one or more nodes, such as nodes 103a-103c and/or other computer systems, connecting to one or more inventory storage devices 105, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from nodes 103a-103c, inventory storage devices 105, and/or other endpoint devices. In various embodiments, the network state tracking system 101 additionally includes input and output devices, such as a keyboard, a mouse, display devices, etc.

While a network state tracking system 101 configured as described may be used in some embodiments, in various other embodiments, the network state tracking system may be implemented using devices of various types and configurations, and having various components. The memory 201 may include a network state tracking controller 210 which contains computer-executable instructions that, when executed by the CPU 202, cause the network state tracking system 101 to perform the operations and functions described herein. For example, the programs referenced above, which may be stored in computer memory 201, may include or be comprised of such computer-executable instructions. The memory 201 may also include a network state machine learning model 212 which is trained to suggest an action to take when a change in the state of a network is detected. In some embodiments, the network state machine learning model 212 is trained to perform other functions, such as: to predict demand on the network; predict failures in the network; propose configuration changes to the network, such as for enhancing performance, optimizing utilization, etc.; to schedule operations on the network; etc. In some embodiments, the network state tracking system 101 includes multiple network state machine learning models 212. In such embodiments, the multiple network state machine learning models 212 may perform different functions. The memory 201 may also include data regarding a current network status 214, which includes data describing the current status of nodes on the network. The memory 201 may also include a historical network status 216, which includes data describing the status of nodes on the network in the past. The current network status 214 and historical network status 216 may be used to train the network state machine learning model 212 and detect whether a change in the network has occurred. In some embodiments, current network status 214 and historical network status 216 may be used to train the network state machine learning model 212 to predict demand on the network; predict failures in the network; propose configuration changes to the network, such as for enhancing performance, optimizing utilization, etc.; to schedule operations on the network; etc.

The network state tracking controller 210 and network state machine learning model 212 perform the core functions of the network state tracking system 101, as discussed herein and also with respect to FIGS. 4 through 9. In particular, the state tracking controller 210 obtains status data from nodes 103a-103c, and uses the status data to determine whether a change in the network state has occurred and to train a network state machine learning model 212 to recommend an action to take based on a determination that the network state has changed or is likely to change. The network state tracking controller 210 may additionally include instructions to transmit an indication of a configuration file for a node 103a-103c, based on the recommended action received from the machine learning model 212. The network state tracking controller 210 may additionally contain computer-executable instructions to cause the server to perform some or all of the operations further described in FIGS. 4-9. The network state tracking controller 210 may additionally contain computer-executable instructions to implement the network state machine learning model 212 as an artificial neural network, machine learning, and/or other artificial intelligence components to determine an a recommended action to take when a change in the network state is detected, or to determine whether a change in the network state has occurred. In some embodiments, the functions of the network state machine learning model 212 are implemented through other computer automation tools or techniques, such as by using a rules-engine. The functions of the network state machine learning model 212 may also be implemented by using a combination of machine learning and a rules-engine. The network state machine learning model 212 may be implemented outside of the network state tracking system 101. The network state machine learning model 212 may include an API to communicate with the network state tracking system 101, as well as to obtain the current status 214 and historical status 216. The state tracking controller 210 may also include computer-executable instructions for receiving input related to node configurations, node settings, optimal network benchmarks, network status goals, etc. For example, the artificial intelligence components of the system may receive in real time digital signals indicative of the status of various nodes as the state of each individual node changes, and create snapshots of the network as the status of each of the nodes is received. The snapshots can then be used to train the network state machine learning model 212 to recommend an action to take when a change in the networks state has occurred. The accuracy of such recommendations may be provided in a feedback loop to artificial intelligence components such that the artificial intelligence components may learn which digital signals indicative of what types of changes in the network status necessitate an action to be taken.

Figure 3:
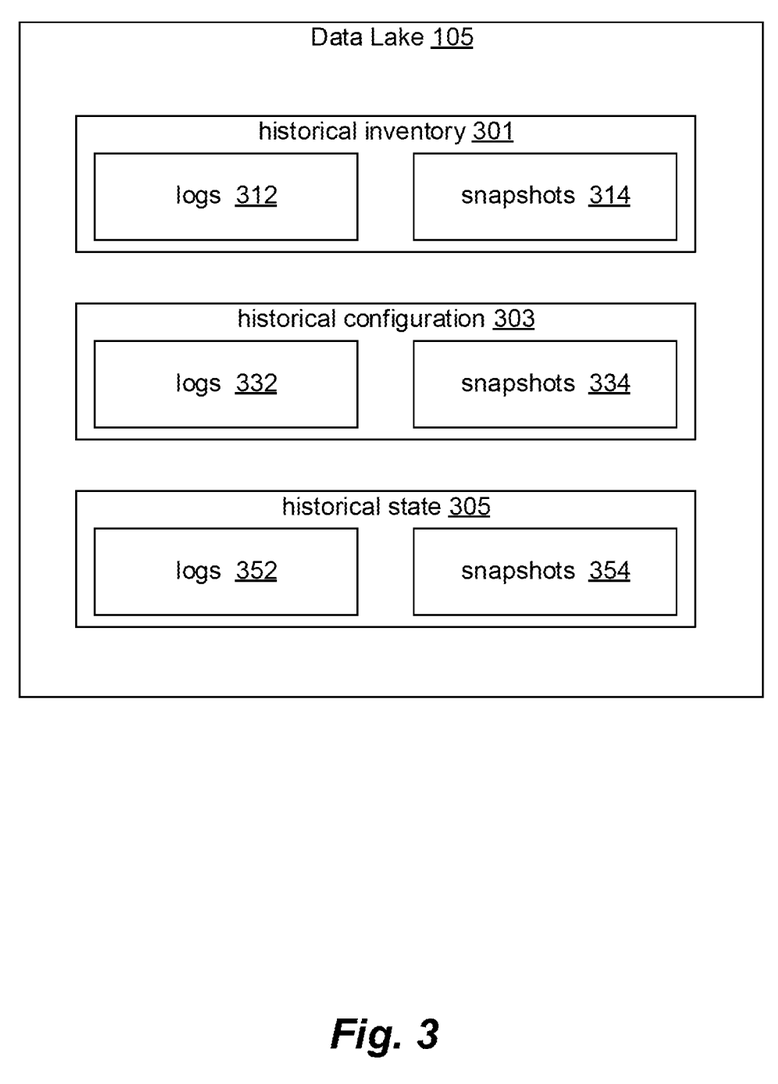
FIG. 3 is a block diagram depicting an example data lake, which may be included in an inventory storage device according to various embodiments described herein.

The current network status 214 and historical network status 216 include data from nodes describing the current network status and historical network status respectively. The data describing the network status may be in the form of snapshots of the network generated by the network state tracking controller 210 based on data obtained from nodes 103a-103c. The data describing the network status may be comprised of changes to the network status over time, such that it can be used to reconstruct the state of the network at any time which the network state tracking controller has network status data. The current network status 214 and historical network status 216 may be stored in an inventory storage device 105, for example, in a data lake, such as the data lake 300, in addition to, or instead of, being stored along with the network state tracking system.

In an example embodiment, the network state tracking controller 210 and/or computer-executable instructions stored on memory 201 of the network state tracking system 101 are implemented using standard programming techniques. For example, the network state tracking controller 210 and/or computer-executable instructions stored on memory 201 of the network state tracking system 101 may be implemented as a "native" executable running on CPU 202, along with one or more static or dynamic libraries. In other embodiments, the network state tracking controller 210 and/or computer-executable instructions stored on memory 201 of the network state tracking system 101 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the networks state tracking system 100.

In addition, programming interfaces to the data stored as part of the network state tracking controller 210, current network status 214, and historical network status 216 can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The network state tracking controller 210, current network status 214, and historical network status 216 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the network state tracking system 101, nodes 103a-103c, and/or the inventory storage device 105.

Furthermore, in some embodiments, some or all of the components/portions of the network state tracking controller 210, network state machine learning model 212, and/or functionality provided by the computer-executable instructions stored on memory 201 of the network state tracking system 101 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, nodes, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VB Script, and the like) and declarative (e.g., SQL, Prolog, and the like).

FIG. 3 is a block diagram depicting an example data lake 300, which may be included in an inventory storage device 105 according to various embodiments described herein. The data lake 300 includes a historical inventory 301, a historical configuration 303, and a historical state 305. The historical inventory 301 is used to store logs 312 and snapshots 314 related to the inventory of the network, thereby allowing a network storage device to easily access the repository containing logs and snapshots describing the nodes currently connected to, or which have been at some point connected to, the network. The historical configuration 303 operates in a similar manner to the historical inventory 301, except the historical configuration 303 is used to store logs 332 and snapshots 334 describing the configuration of nodes which are connected to, or have been connected to, the network. The historical configuration 303 is thus able to store data indicating the configuration of any node at any time for which a snapshot was taken. The historical state 305 operates in a similar manner to the historical inventory 301 and historical configuration 303, except the historical state 305 is used to store logs 352 and snapshots 354 describing the state of the network at various times. The data lake 300 may be implemented by using one or more inventory storage devices 105.

FIGS. 4a-4d each depict example embodiments of a network state tracking system interacting with current network management infrastructure, such as a container-orchestration system, e.g. Kubernetes. Each of the embodiments of FIGS. 4a-4d depict different manners of incorporating a network state tracking system by utilizing existing network management infrastructure, thereby saving time, development resources, and computing resources by efficiently communicating with existing infrastructures.

Figure 4A:
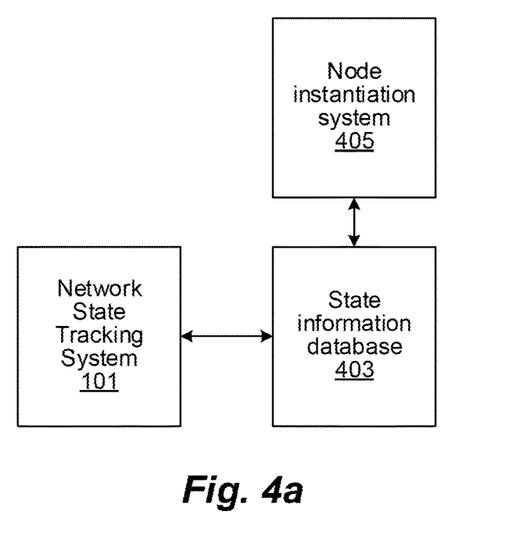
FIG. 4a is a display diagram depicting a network state tracking system interacting with network management infrastructure through a state information database according to various embodiments described herein.

FIG. 4a is a display diagram depicting a network state tracking system interacting with network management infrastructure through a state information database according to various embodiments described herein. In FIG. 4a, the network state tracking system 101 communicates with a state information database 403, which in turn communicates with a node instantiation system 405. The node instantiation system 405 is used to create and manage nodes. In some embodiments, the node instantiation system 405 utilizes a container-orchestration system, such as Kubernetes. The state information database 403 is used to collect state and status information regarding nodes managed by the node instantiation system 405. In some embodiments, the state information database 403 utilizes a key-value storage system, such as etcd, to store the state and status information.

In FIG. 4a the network state tracking system 101 communicates with the state information database 403, such as via an API, to obtain state and status information regarding the nodes.

Figure 4B:
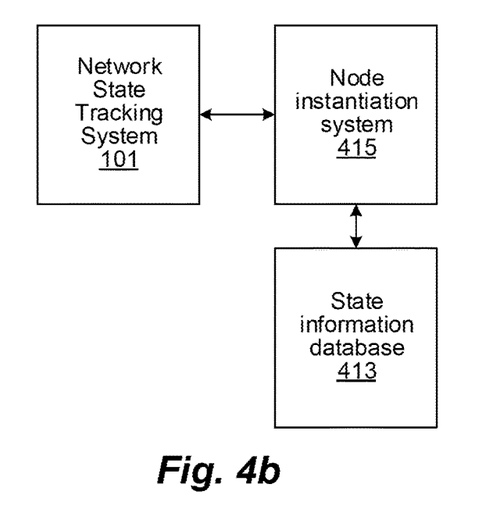
FIG. 4b is a display diagram depicting a network state tracking system interacting with network management infrastructure through a node instantiation system according to various embodiments described herein.

FIG. 4b is a display diagram depicting a network state tracking system interacting with network management infrastructure through a node instantiation system according to various embodiments described herein. In FIG. 4b, the network state tracking system 101 communicates with the node instantiation system 415, which in turn communicates with a state information database 413. In such embodiments, the node instantiation system 415 provides data to the network state tracking system 101 regarding each node and each node's status.

Figure 4C:
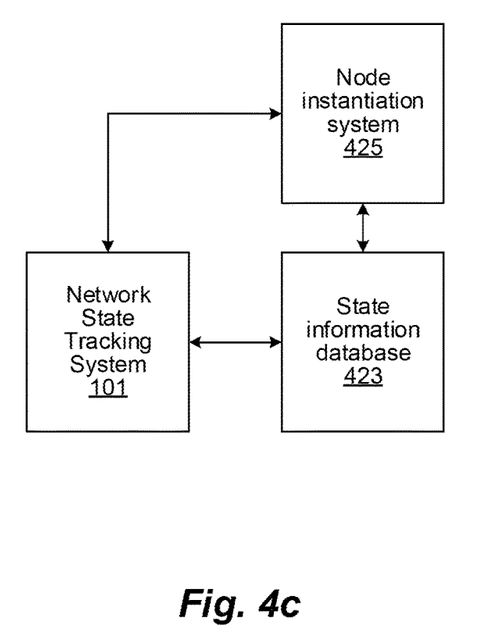
FIG. 4c is a display diagram depicting a network state tracking system interacting with network management infrastructure through both a node instantiation system and a state information database according to various embodiments described herein.

FIG. 4c is a display diagram depicting a network state tracking system interacting with network management infrastructure through both a node instantiation system and a state information database according to various embodiments described herein. In FIG. 4c, the network state tracking system 101 communicates with the node instantiation system 425 by using the API of the state information database 423. For example, if the state information database 423 utilizes etcd, the network state tracking system 101 would utilize the etcd API to communicate with the node instantiation system 425. The network state tracking system 101 additionally periodically syncs its data with the state information database 423 to ensure that it has the correct status data for each node. In such embodiments, the network state tracking system 101 is able to obtain and verify node status data without changing any of the existing network infrastructure.

Figure 4D:
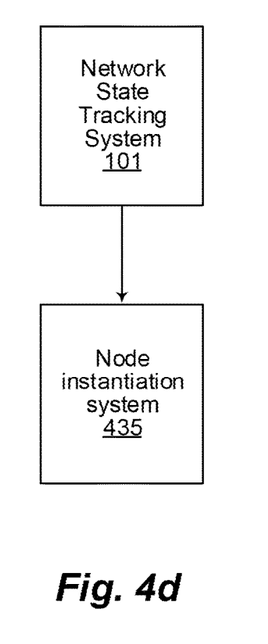
FIG. 4d is a display diagram depicting a network state tracking system interacting with network management infrastructure through a node instantiation system according to various embodiments described herein.

FIG. 4d is a display diagram depicting a network state tracking system interacting with network management infrastructure through a node instantiation system according to various embodiments described herein. In FIG. 4d, the network state tracking system 101 communicates directly with the node instantiation system 435 and replaces a state information database. In such embodiments, the network state tracking system 101 additionally performs the operations of the state information database, and communicates with the node instantiation system 435 by using an API familiar to the node instantiation system 435, such as an etcd API.

Figure 5:
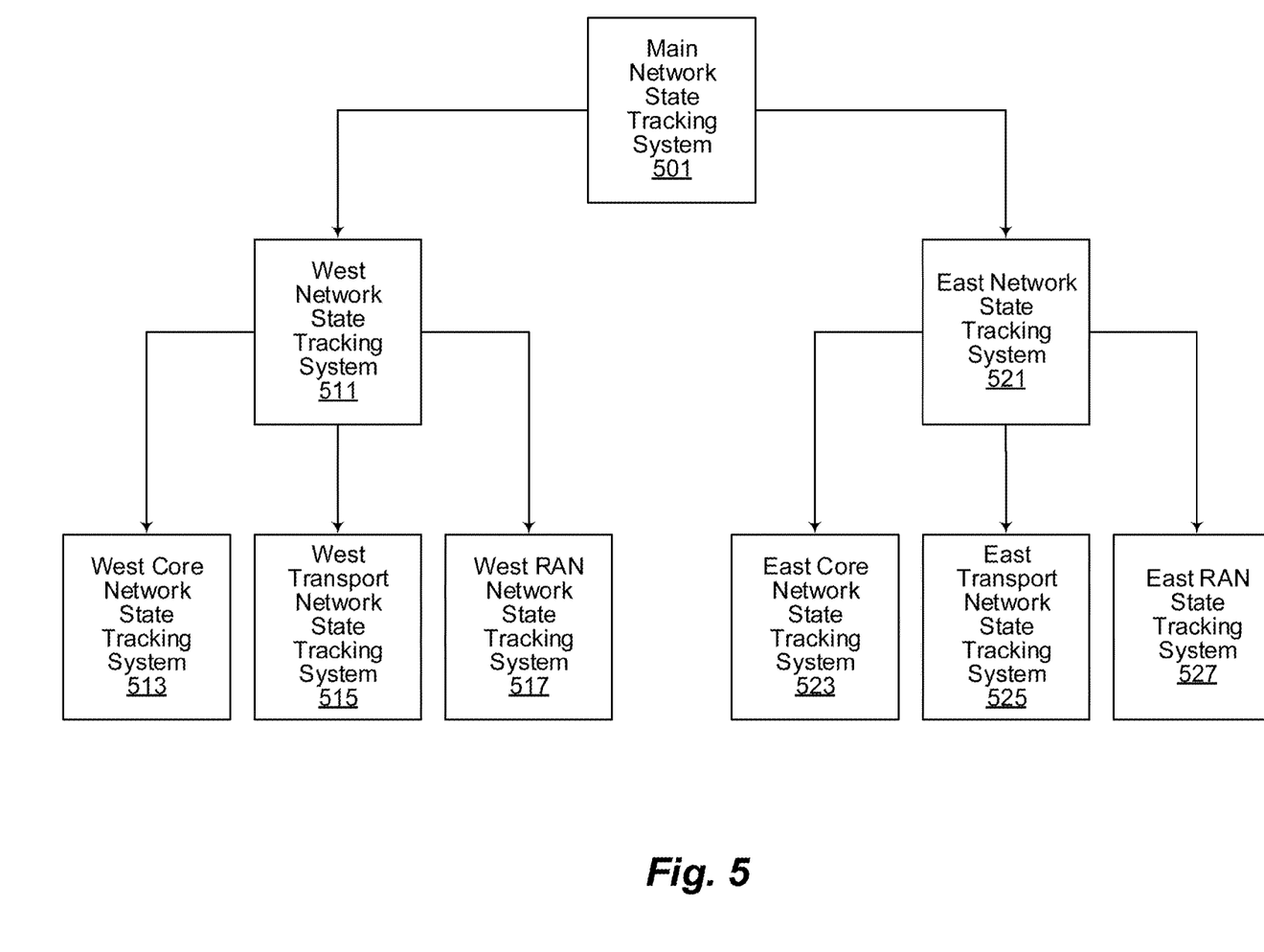
FIG. 5 is a display diagram depicting a distributed network state tracking system according to various embodiments described herein.

FIG. 5 is a display diagram depicting a distributed network state tracking system according to various embodiments described herein. In some embodiments, the distributed network state tracking system infrastructure is used to operate the network state tracking system over large areas by utilizing "child" network state tracking systems to represent different areas. The distributed network state tracking system includes a main network state tracking system 501 which communicates with two "child" network state tracking system: a west network state tracking system 511 and an east network state tracking system 521. The west network state tracking system 511 communicates with three "child" network state tracking systems: a west core network state tracking system 513, a west transport network state tracking system 515, and a west RAN network state tracking system 517. The east network state tracking system 521 communicates with three "child" network state tracking systems: an east core network state tracking system 523, an east transport network state tracking system 525, and an east RAN network state tracking system 527. The child network state tracking systems each collect data to create snapshots, detect when the state of their network, or portion of a network, has changed, and to train a machine learning model to recommend an action to take in response to a change in the state of the network. The "parent" network state tracking system obtains data from each of its child network state tracking systems to: create snapshots of the network, detect changes in the state of the network, and train a machine learning model to recommend an action to take in response to a change in the state of the network.

In some embodiments, the parent network state tracking system and child network state tracking systems each recommend actions based on different changes in a network's state. For example, the West Transport Network State Tracking system 515 may detect that a node has gone offline, and recommend and action in response to detecting the node which has gone offline. However, the Main Network State Tracking system 501 would not recommend an action for the node which has gone offline. Likewise, the Main Network State Tracking system may detect that a large portion of nodes in the East Network State Tracking system 521 have gone offline and would recommend an action to take in response to detecting that the large portion of nodes are offline. In some embodiments, the recommended action may include taking a corrective action, informing a system that is capable of taking a corrective action, informing operators capable of taking a corrective action, etc.

Figure 6:
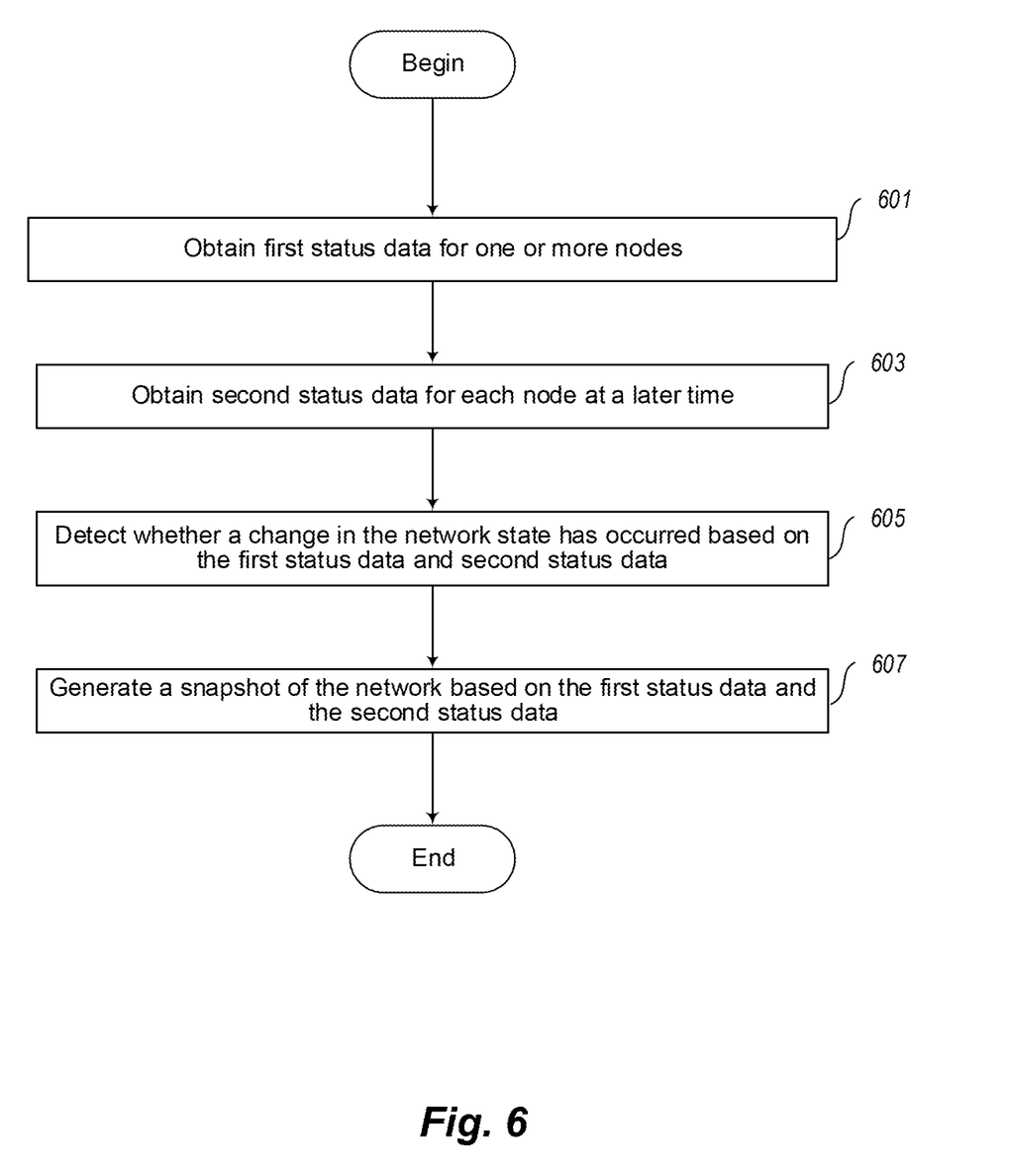
FIG. 6 is a flow diagram depicting a process for generating snapshots of a network based on status data, according to various embodiments describe herein.

FIG. 6 is a flow diagram depicting a process for generating snapshots of a network based on status data, according to various embodiments described herein. At act 601, the network state tracking system obtains first status data for one or more nodes connected to the network. At act 603, the network state tracking system obtains second status data for the one or more connected to the network at a later time. At act 605, the network state tracking system detects whether a change in the network state has occurred based on a comparison of the first status data and the second status data. In some embodiments, a change in the network state includes: changes in the status of one or more nodes, such as bandwidth usage of a node, connection strength of a node, configuration of a node, etc., the addition of new nodes to the network, the removal of nodes from the network, etc. At act 607, the network state tracking system generates a snapshot of the network based on the first status data and the second status data. In some embodiments, the snapshot includes information describing the status data for each of the one or more nodes connected to the network. The information included within the snapshot may be used to represent the state of the network at a specified moment in time.

In some embodiments, the network state tracking system generates a "partial snapshot" by storing the differences, or incremental changes, between the current network state and the network state of a previously generated snapshot to generate the snapshot of the network instead of generating a complete snapshot of the network. The partial snapshot of the network may include only the differences between the current network state and the network state of the previously generated snapshot. Additionally, the partial snapshot of the network may include more than only the differences between the current network state and the network state of the previously generated snapshot, such as additional data regarding one or more specified nodes, logs for one or more specified nodes, configuration data for one or more nodes, etc. In such embodiments, the network state tracking system is able to reconstruct the network at certain moments in time by applying the differences indicated by the partial snapshots to a previously generated complete snapshot.

In some embodiments, the network state tracking system obtains status data when a node is connected to, or loses its connection to, the network. The status data may include data obtained from logs generated by a node. The status data may include configuration data of a node. The network state tracking system may obtain the status data periodically. The network state tracking system may generate network state snapshots periodically. In some embodiments, the network state tracking system only generates network state snapshots periodically, instead of when a change in the network state is detected. The network state tracking system may generate network state snapshots both periodically and when a change in the network state is detected. In some embodiments, the network state tracking system receives an indication to generate a network snapshot. The indication to generate a network snapshot may be obtained via user input, from another computer system, etc.

The network state tracking system may obtain status data from nodes, or generate a snapshot, based on a multitude of detected events, including, but not limited to: instantiation events triggered by an orchestration system; network expansion events, such as adding a new node or new network infrastructure (such as a networking devices, cell towers, repeaters, etc.); "life cycle" events reported by an orchestrator, such as the transition of a node from an idle state to an in-service state; "failure events" such as when a line is cut, a piece of the network infrastructure is inoperable, etc.; and changes in configurations, such as adding a new VLAN to the network to handle high priority traffic, opening an interface to a new Data Network, rearranging systems to re-balance traffic load, etc.

Figure 7:
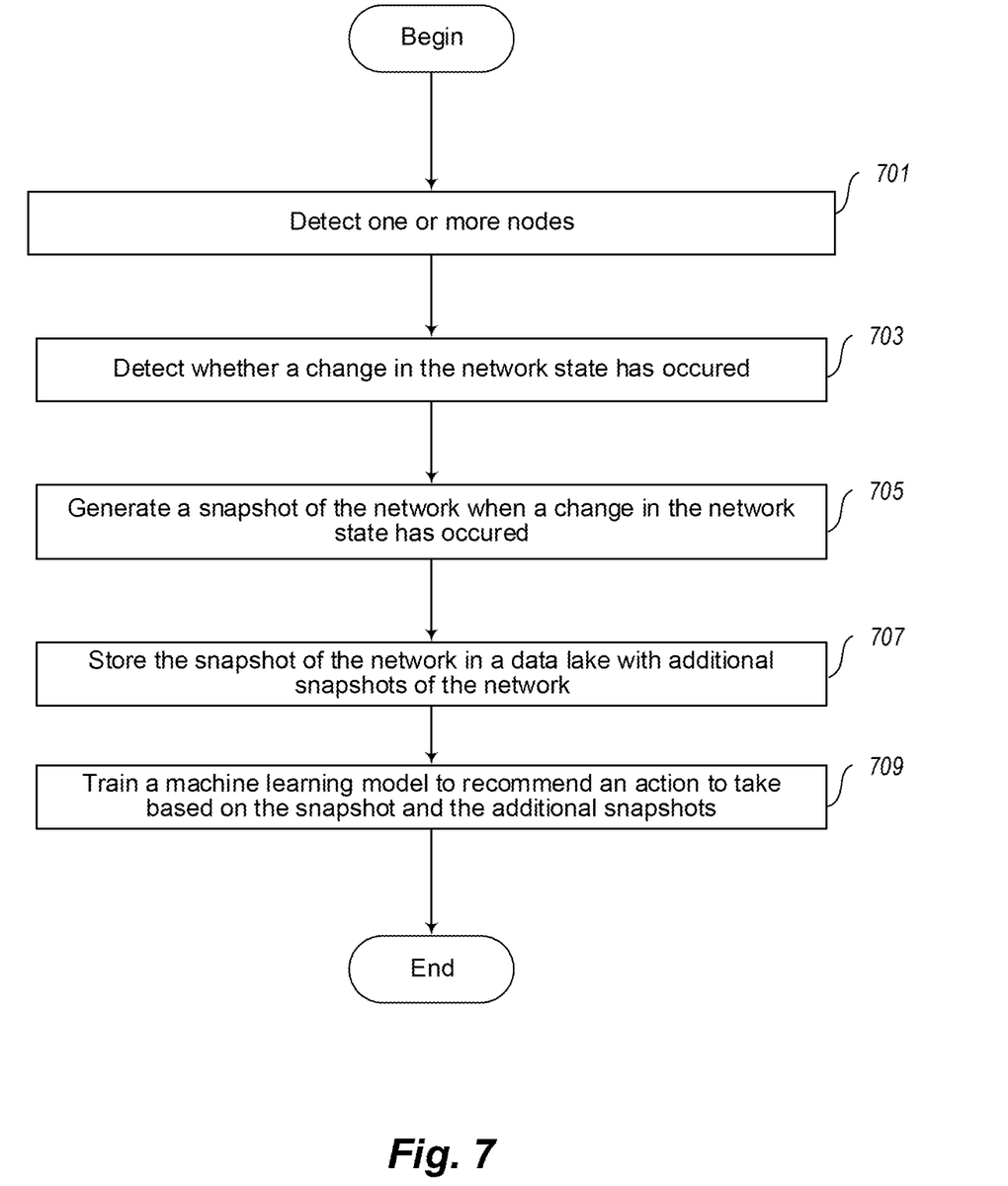
FIG. 7 is a flow diagram depicting a process for training a machine learning model to recommend an action to take based on generated snapshots, according to various embodiments described herein.

FIG. 7 is a flow diagram depicting a process for training a machine learning model to recommend an action to take based on generated snapshots, according to various embodiments described herein. At act 701, the network state tracking system detects one or more nodes connected to the network. At act 703, the network state tracking system detects whether a change in the network state has occurred. In some embodiments, act 703 is performed in a similar manner to act 605 of FIG. 6. At act 705, the network state tracking system generates a snapshot of the network when a change in the network has occurred. In some embodiments, act 705 is performed in a similar manner to act 607 of FIG. 6.

At act 707, the network state tracking system stores the snapshot of the network in an inventory storage devices, along with additional snapshots of the network. In some embodiments, the snapshots are stored within a data lake. At act 709, the network state tracking system trains a machine learning model to recommend an action to take based on the stored snapshots. In some embodiments, act 709 is performed for each snapshot obtained. In some embodiments, act 709 is performed periodically, such as every minute, hourly, weekly, monthly, etc., and the machine learning model is trained based on a plurality of network snapshots gathered over a period of time.

In some embodiments, acts 705-707 are performed periodically, such as every microsecond, every second, every minute, hourly, daily, weekly, etc., regardless of whether a change is detected in the network state. The captured snapshots may then be used to determine whether a change in the network has occurred.

In some embodiments, the machine learning model is trained to perform other functions, such as: to predict demand on the network; to predict failures in the network; to propose configuration changes to the network, such as for enhancing performance, optimizing utilization, etc.; to schedule operations on the network; etc. In some embodiments, the snapshots may be used to train multiple machine learning models.

In some embodiments, the network state tracking system identifies actions to take based on one or more of: the detected changes in the network state and logs obtained for each node. The network state tracking system may identify an action to take by identifying a change in the network state between two snapshots and classifying that change as an action. For example, the network state tracking system may detect that a change has occurred where a node has lost its connection, and then another change has occurred where the node is brought back online by restarting the node. The network state tracking system may then identify that restarting the node is an action taken after the node lost its connection based on the changes in the network state or based on logs obtained from the node. The action may include one or more of, but are not limited to: adjusting one or more configurations for a node, pushing an old configuration to a node, restarting a node, taking a node offline, adding a new node, doing nothing, etc. The network state tracking system may perform the action itself without user interaction, such as by transmitting an indication of an action to take to a specific node. The network state tracking system may transmit an indication of the action to take to a network manager.

In some embodiments, the network state tracking system additionally identifies whether a "positive outcome" has occurred after a change in network state, and may attribute that positive outcome to an action which changed the network state. For example, the network state tracking system may detect that a change has occurred, where a certain group of nodes experience bandwidth issues after a node is added to the group. The network state tracking system may then detect that the bandwidth issues, by analyzing logs and/or the status of nodes in the group, have been reduced when a switch was added to the group of nodes. The network state tracking system would identify the reduction of bandwidth issues as a "positive outcome" and identify the action to be adding a switch to the group of nodes to help regulate the network bandwidth. The network tracking system may perform similarly to detect whether a "negative outcome" has occurred after a change in the network state, and may attribute that negative outcome to an action which changed the network state. In some embodiments, determining whether a negative outcome has occurred allows the network state tracking system to train a machine learning model to predict which change caused a change in the network state.

Figure 8:
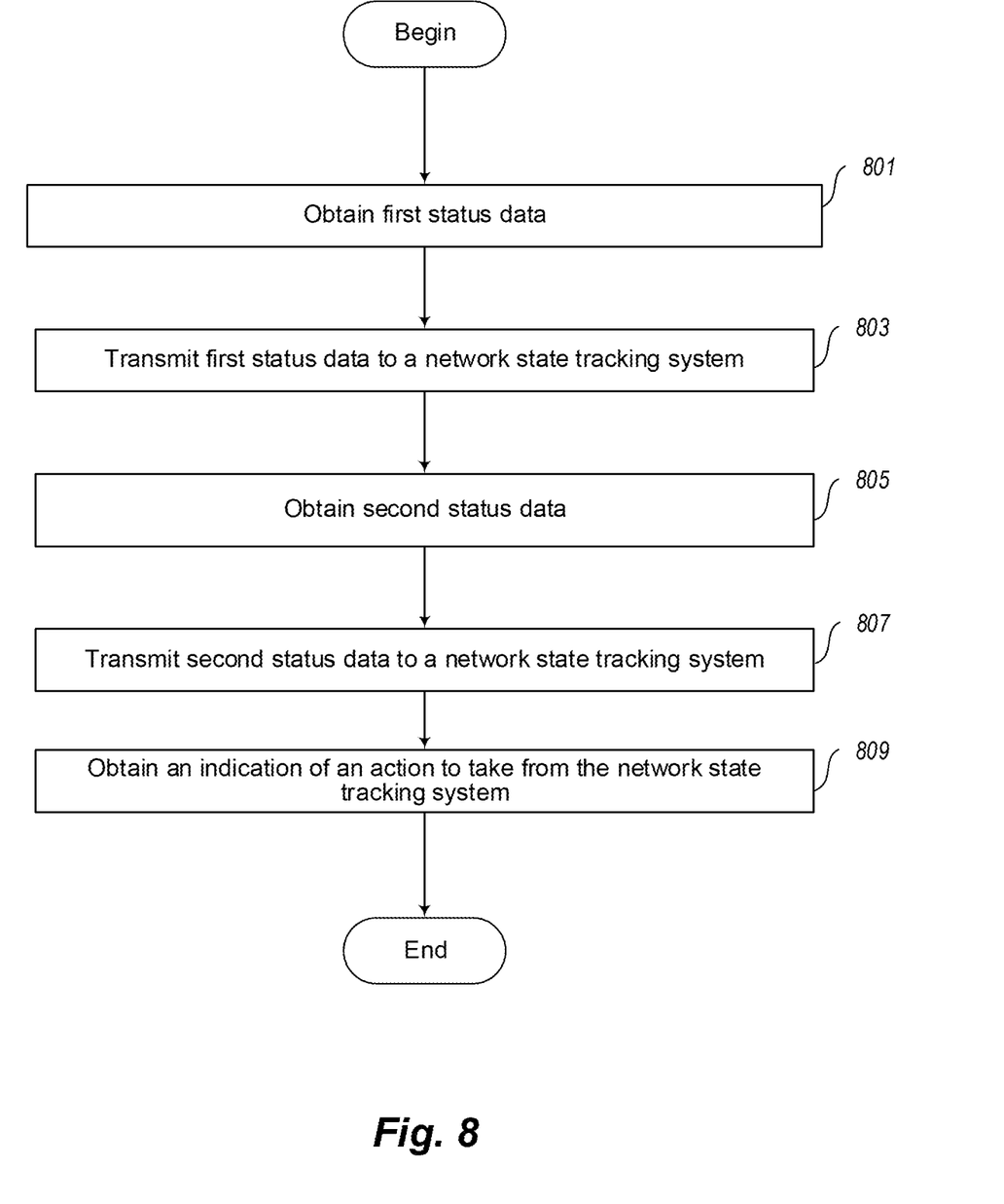
FIG. 8 is a flow diagram depicting a process for obtaining an indication of an action to take from a network state tracking system, according to various embodiments described herein.

FIG. 8 is a flow diagram depicting a process for obtaining an indication of an action to take from a network state tracking system, according to various embodiments described herein. At act 801, a node obtains first status data describing the network status of the computing device. The status data may include configuration data. The status data may include data obtained from logs generated by the computing device. The node may transmit status data to the network state tracking system after detecting that it has connected to a network. At act 803, the node transmits the first status data to a network state tracking system. At act 805, the node obtains second status data at a later time, in a similar manner to act 801. At act 807, the node transmits the second status data to the network state tracking system. At act 809, the node obtains an indication of an action to take from the network state tracking system. In some embodiments, the action may include one or more of, but is not limited to: changing a configuration of the node, restarting the node, taking the node offline, bringing another node either online or offline, etc. In some embodiments, at act 809, the indication of an action to take is obtained from one or more machine learning models in a network state tracking system. The indication of an action to take may be obtained from a combination of one or more machine learning models and one or more rules. The one or more rules may be stored by the network state tracking system, the node, or another device.

Figure 9:
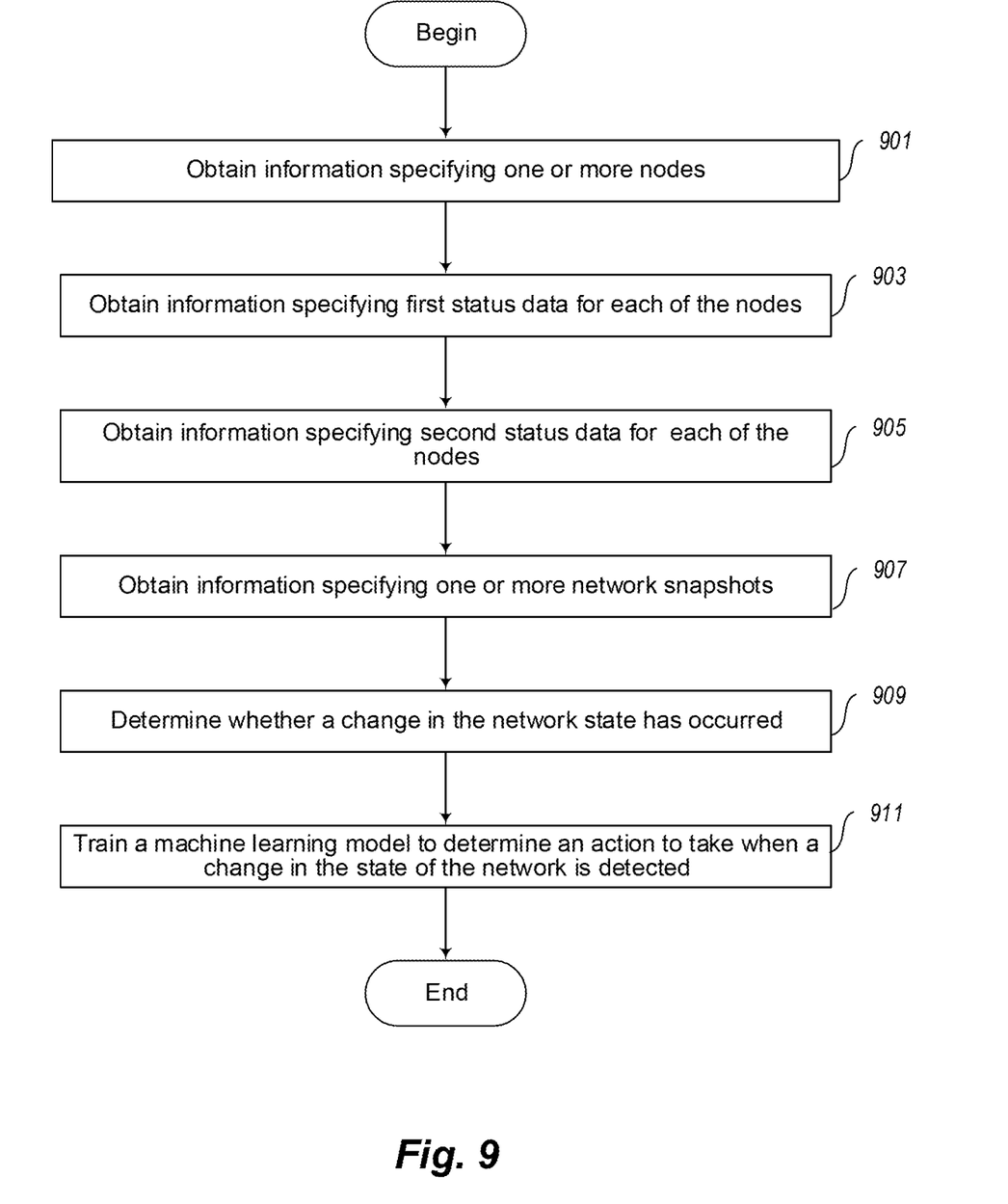
FIG. 9 is a flow diagram depicting a process to use a network state tracking data structure to train a machine learning model to determine an action to take when a change in the network state is detected, according to various embodiments described herein.

FIG. 9 is a flow diagram depicting a process to use a network state tracking data structure to train a machine learning model to determine an action to take when a change in the network state is detected, according to various embodiments described herein. At act 901, the network state tracking data structure obtains information specifying one or more nodes. At act 903, the network state tracking data structure obtains information specifying first status data for at least a portion of the one or more nodes. At act 905, the network state tracking data structure obtains information specifying second status data for the nodes. At act 907, the networks state tracking data structure obtains information specifying one or more network snapshots. The information specifying one or more network snapshots may be obtained from a network state tracking system. At act 909, the information stored in the network state tracking data structure is used to determine whether a change in the network state has occurred, such as by determining whether there are differences between a current snapshot and a previous snapshot of the network state. At act 911, the information stored in network state tracking data structure is used to train a machine learning model to determine an action to take when a change in the state of the network is detected. In some embodiments, the network state tracking data structure is stored in an inventory storage device. The network state tracking data structure may be stored in a data lake. In some embodiments, the network state tracking data structure stores configuration data for at least one of the nodes.

In some embodiments, the machine learning model is trained to perform other functions, such as: to predict demand on the network; to predict failures in the network; to propose configuration changes to the network, such as for enhancing performance, optimizing utilization, etc.; to schedule operations on the network; etc. In some embodiments, the network state tracking data structure may be used to train multiple machine learning models.

In some embodiments, the network state tracking data structure stores additional data describing the network snapshots. The network state data structure may store data describing a time that a network snapshot was taken. The network state tracking data structure may store the differences between a network snapshot and a snapshot taken before or after the network snapshot.

In some embodiments, the network state tracking data structure stores information specifying one or more sub-networks (or "child" networks) included within the network. Each of the sub-networks may include their own network state tracking data structure. The network state tracking data structure may also include information one or more "parent" networks which the network state tracking data structure is included in.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
at least one processor; and
at least one memory coupled to the at least one processor, the memory having computer-executable instructions stored thereon that, when executed by the at least one processor, cause the system to:
electronically detect one or more nodes of a network;
electronically generate one or more snapshots of the network, wherein the one or more snapshots of the network are generated by:
electronically obtaining first status data for each node of the one or more nodes;
electronically obtaining second status data for each node of the one or more nodes;
electronically detecting whether a change in a state of the network has occurred based on at least the first status data and the second status data; and
electronically generating the one or more snapshots of the network based on the first status data and the second status data based on a determination that a change in the network has occurred;
electronically obtain an indication of a prior state of the network;
electronically reconstruct the prior state of the network based on the one or more snapshots; and
electronically train a machine learning model to recommend an action to take based on the one or more snapshots of the network and the reconstructed prior state of the network.

2. The system of claim 1, wherein at least one of the first status data and the second status data are obtained when a node is connected to the network.

3. The system of claim 1, wherein at least one of the first status data and the second status data are obtained from logs generated by a node.

4. The system of claim 1, wherein the at least one of the first status data and the second status data include configuration data of a node.

5. The system of claim 1, wherein the computer-executable instructions, when executed by the at least one processor, further cause the system to:
electronically obtain third status data for each node of the one or more nodes;
electronically detect whether a change in the state of the network has occurred based on at least two of: the first status data, the second status data, and the third status data;
electronically generate a second snapshot of the network based on the determination that a change in the network has occurred and at least two of: the first status data, the second status data, and the third status data; and
electronically obtain in indication of an action to take from the machine learning model based on the second snapshot.

6. The system of claim 1, wherein the at least one processor generates the one or more snapshots periodically.

7. The system of claim 1, wherein the computer-executable instructions, when executed by the at least one processor, further cause the system to:
  electronically receive a request to generate the one or more snapshots from an external system;
  in response to receiving the request, electronically generating the one or more snapshots.

8. The system of claim 1, wherein the generating the one or more snapshots further comprises:
  electronically determining one or more differences between the snapshot and a previous snapshot;
  electronically storing the one or more differences between the snapshot and the previous snapshot.

9. The system of claim 8, further comprising a data lake, wherein the one or more differences between the snapshot and the previous snapshot are stored within the data lake.

10. The system of claim 1, further comprising:
  one or more inventory storage devices, the one or more inventory storage devices including data received from the one or more nodes, wherein at least the first status data and the second status data are obtained from the one or more inventory storage devices.

11. A method in a node, the method comprising:
  electronically obtaining, by at least one processor, first status data, the first status data including network state information of the node;
  electronically transmitting, by the at least one processor, the first status data to a network state tracking system;
  electronically obtaining, by the at least one processor, second status data, the second status data including network state information of the node;
  electronically transmitting, by the at least one processor, the second status data to a network state tracking system; and
  electronically obtaining, by the at least one processor, an indication of an action to take, the action being determined based on at least:
    the first status data;
    the second status data; and
    a machine learning model trained based on a plurality of network state snapshots, one or more past actions, and a set of rules.

12. The method of claim 11, further comprising:
  electronically determining, by the at least one processor that the node has connected to a network; and
  electronically transmitting the first status data to the network state stacking system based on the determination that the node has connected to a network.

13. The method of claim 11, further comprising:
  electronically generating, by the at least one processor, a log, the log including configuration information for the node and state information for the node; and
  electronically obtaining, by the at least on processor, at least one of the first status data and the second status data based on the log.

14. The method of claim 11, further comprising:
  electronically obtaining, by the at least one processor, configuration data, wherein the action to take includes applying the configuration data to the node.

15. The method of claim 11, further comprising:
  electronically receiving, by the at least one processor, an indication to transmit status data to a network state tracking system;
  electronically obtaining, by the at least one processor, third status data, the third status data including network state information of the node;
  electronically transmitting, by the at least one processor, the third status data to a network state tracking system; and
  electronically obtaining, by at the at least one processor, an indication of an action to take, the action being determined based on at least:
    the first status data;
    the second status data;
    the third status data; and
    a machine learning model trained based on a plurality of network state snapshots.

16. The method of claim 11, wherein the network state tracking system includes one or more inventory storage devices, and the first status data and the second status data are transmitted to the one or more inventory storage devices.

17. One or more storage devices collectively storing a network state tracking data structure for access and processing by a program executed by at least one computer processor that, when accessed and processed by at least one computer processor, functionally enables the computer processor to:
  obtain one or more network snapshots describing a state of a network at one or more time periods; and
  determine an action to take based on the state of the network, the network state tracking data structure comprising:
    information specifying one or more nodes;
    information specifying first status data obtained from the one or more nodes;
    information specifying second status data obtained from the one or more nodes; and
    information specifying the one or more network snapshots,
  such that the information specifying first status data and the information specifying the second status data are usable to detect whether a change in the state of the network has occurred,
  such that the information specifying the one or more nodes and the information specifying one or more snapshots are usable to reconstruct a previous state of the network, and
  such that the information specifying one or more network snapshots and the reconstructed previous state of the network is usable to train a machine learning model to determine an action to take when a change in the state of the network is detected.

18. The one or more storage device of claim 17, the network state tracking data structure further comprising:
  information specifying one or more differences between one or more of the one or more network snapshots; and
  information specifying a time a network snapshot was generated for at least one of the one or more network snapshots,
  such that the information specifying one or more differences between one or more of the one or more network snapshots is usable to reconstruct the network state at a time a network snapshot was generated.

19. The one or more storage device of claim 17, the network state tracking data structure further comprising:
  information specifying configuration data,
  such that the configuration data can be provided to nodes as part of an action to take when the change in the state of the network is detected.

20. The one or more storage device of claim 17, further comprising:
  information specifying one or more sub-networks included within the network, the one or more information specifying one or more sub-networks including representative one or more network state tracking data structures for each of the one or more sub-networks.

\* \* \* \* \*